June 10, 1941.    W. O. BUNDY, JR., ET AL    2,245,460
PRESSURE ACTUATED ELECTRICAL TIRE SIGNAL
Filed Feb. 28, 1939    2 Sheets-Sheet 2
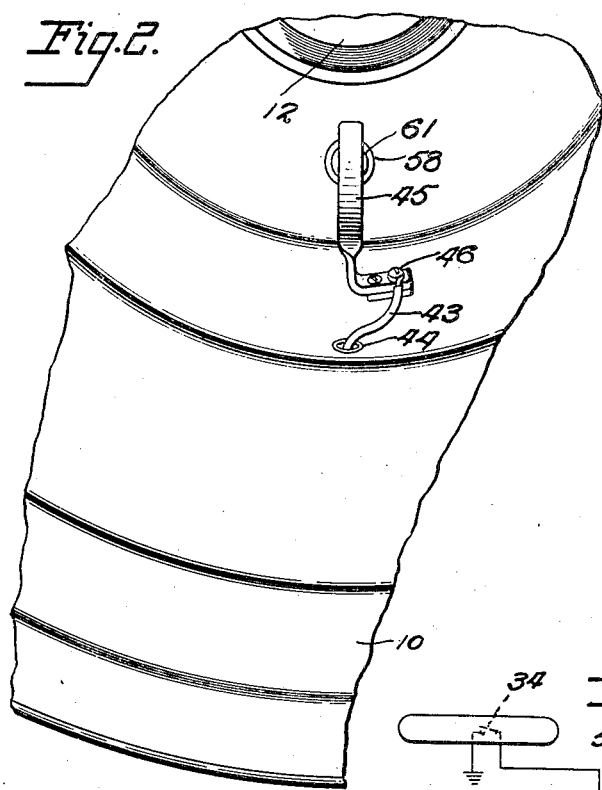
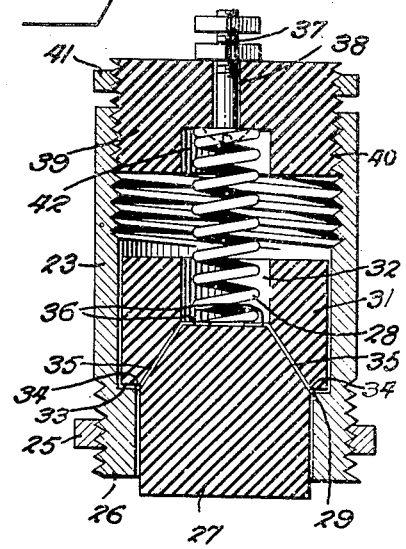
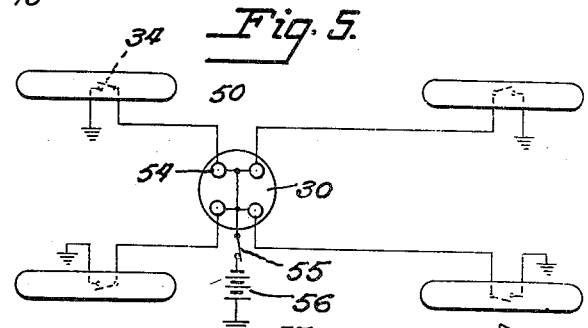
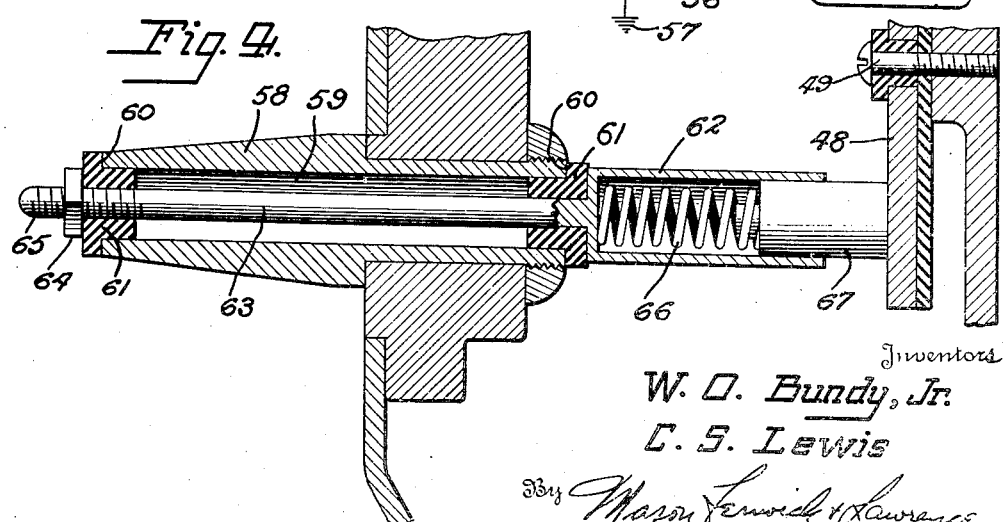
Inventors
W. O. Bundy, Jr.
C. S. Lewis
By Mason Fenwick & Lawrence
Attorneys Patented June 10, 1941

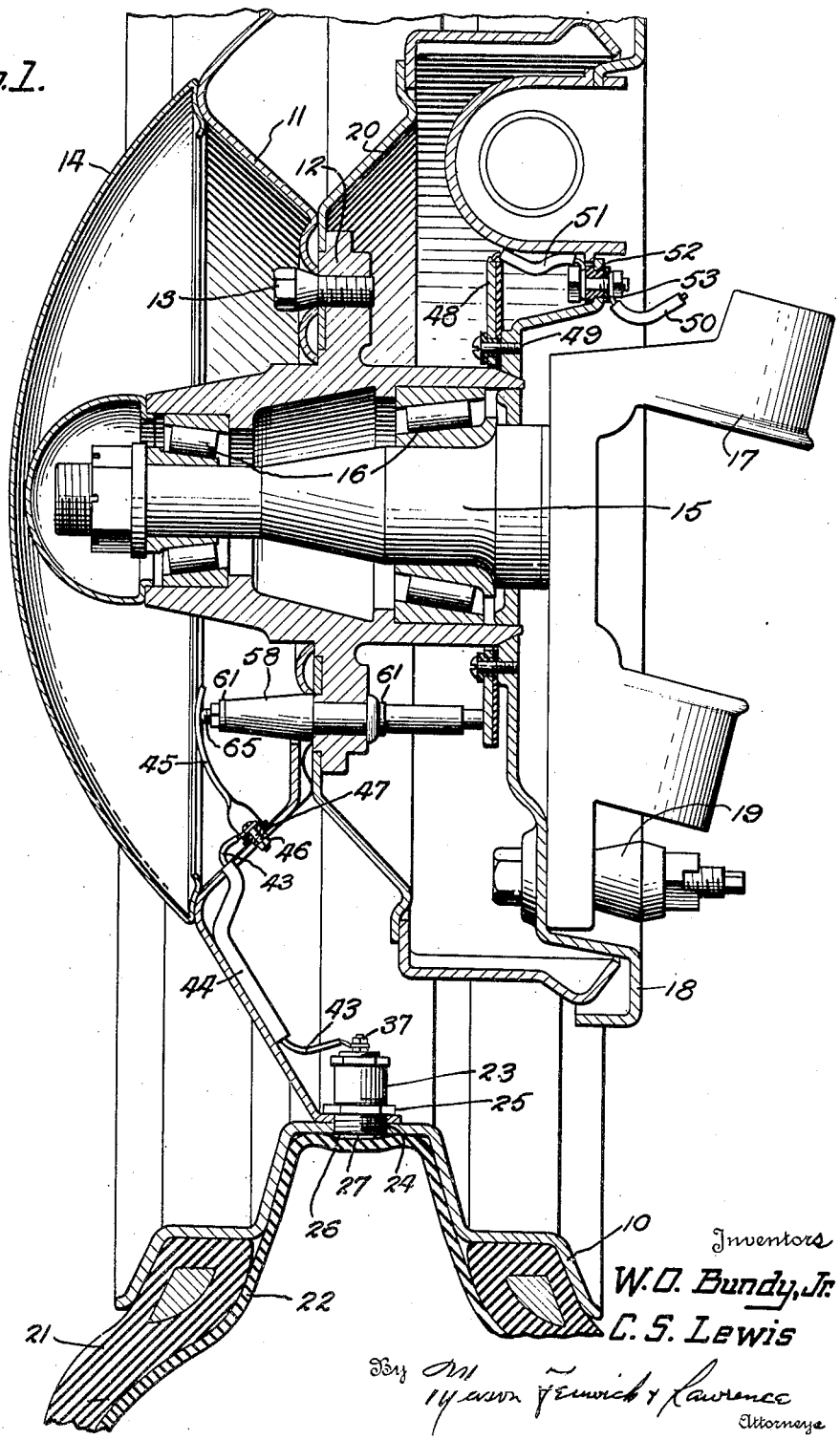

2,245,460

UNITED STATES PATENT OFFICE 2,245,460

PRESSURE ACTUATED ELECTRICAL TIRE SIGNAL

William Oliver Bundy, Jr., and Charles Sinclair Lewis, El Paso, Tex., assignors of thirty-three and one-third per cent to I. Ehrlich, El Paso County, Tex.

Application February 28, 1939, Serial No. 259,024

8 Claims. (Cl. 200—58)

This invention relates to pressure actuated electrical signals and more particularly to signals of this type adapted for use in indicating conditions of tire pressure on motor vehicles, trailers, airplanes, dual wheel trucks, etc.

A number of systems have been developed to indicate the condition of tire pressure on the load carrying wheels of a motor vehicle, but each of these prior art systems has been subject to certain difficulties.

One object of this invention is to avoid the deficiencies in the prior art systems. Another object is to provide a materially simplified system. A further object is to provide means, for indicating tire pressures, which can be readily applied to existing motor vehicles. Another object is to provide apparatus which is relatively inexpensive to manufacture and easily applied. Yet another object is to provide an improved fluid actuated switch means.

Other objects and advantages of this invention will be determined from the following description taken in connection with the accompanying drawings.

In the drawings, wherein like characters of reference indicate corresponding parts in the various figures:

Figure 1 is a vertical cross-section through a motor vehicle wheel of the demountable bolted-on type;

Figure 2 is a partial elevation showing the relative location of the parts, with the hub cover removed;

Figure 3 is an enlarged cross-section view of the pneumatic switch, indicated generally in Figure 1;

Figure 4 is an enlarged view of the brush holder mechanism of Figure 1;

Figure 5 is a schematic wiring diagram of the system as applied to a motor vehicle.

Considering the drawings in greater detail, the device is shown as applied in Figure 1 to a demountable steel wheel of the bolted-on type, and more particularly to a front wheel of a vehicle. In the particular embodiment the wheel includes a drop center rim 10 securely fastened to a wheel body 11 which latter is demountably secured to a rotating hub 12 by means of a plurality of pin-like members such as the attaching studs 13. The assembly in general being completed by a hub cover 14 arranged to snap on to the wheel center portion. The hub 12 is rotatably mounted on the stub axle 15 by means of appropriate anti-friction bearings 16. The stub axle is secured to a yoke 17 which latter is pivotally secured upon the vehicle's axle. The customary brake drum backing plate 18 is fastened to the yoke by one or more bolts 19 and the brake drum 20 is secured upon the hub 12 by an appropriate fastening means. A standard tire casing 21 is shown mounted on the wheel rim, having its inner tube 22 inside the same to maintain the casing properly inflated.

The mechanism is applied to the wheel in a way to utilize a single wire circuit using metal parts of the vehicle as one side of the circuit, and transmitting the electrical circuit by means of sliding contact members housed within the brake drum.

A pneumatically operated switch member 23 is secured in the drop center of the rim by a threaded connection 24, and is locked in place by the nut 25. The outer edge 26 of the switch member is arranged to be flush with the outer surface of the drop center so as to positively preclude any interference with the inner tube itself.

The actuating element or button 27 is biased by a spring 28 into the position of the parts as indicated in Figure 3. The spring is properly calibrated for any pressure which it is desired to maintain in the tire. As long as the tire is properly inflated, the pressure within the inner tube acting against the button 27 will maintain the switch open with the contact broken at the points 29. If a slow leak should occur in the inner tube, or valve, the gradual reduction in pressure will eventually reach a degree corresponding to the tension of the spring 28, with the result that the button will be moved to its outer-most position as shown in Figure 3, thereby completing a circuit to an indicating device 30 carried preferably on the dash board of the vehicle.

The button 27 is preferably made of suitable insulating material such as rubber, Bakelite or other appropriate material, and has an enlarged base 31 which is recessed at 32 to receive the spring 28. The annular shoulder 33 formed on the button element carries a contact member 34 which may be continuous in the form of a ring, or may be in the form of a plurality of arcuate contact portions. As shown, the switch element comprises two contact members extending around the shoulder in the neighborhood of about fifty per cent of its annular length. The circuit extending by connection 35 into the recess 32 wherein it connects to additional contact segments 36.

When the button is in retracted position acting against the pressure of the spring 28, the circuit is open. As soon as pressure is relieved on the outer side of the button, the contact segments 34 engage the material shoulder of the switch housing 23, completing the circuit to ground. The other side of the circuit passes from the contacts 36 through the spring 28 to the adjustable terminal connection 37. The latter passes through a center aperture 38 and an insulating bushing 39 which latter is threaded at 40 to engage the internal threaded part of the housing 33. The two members are locked together by means of a lock nut 41. The spring 28 is received within the recess 42 of the insulating member.

An electrical conductor 43 is connected to the terminal 37 and passes preferably through an insulating bushing or sleeve 44 secured on the inside of the wheel disc. The conductor 43 may pass through the wheel disc as shown, and be secured in electrical circuit with the contact spring 45, or it may be fastened to the securing means 46 on the inner wall of the wheel. It will be understood that the circuit is insulated from the disc body at all times by means of insulating elements 47.

A contact segment or annulus 48 is insulatedly secured to the backing plate 18 by the fastening means 49. The annular contact plate is connected to the wire 50 going to the dashboard of the vehicle, by means of the connection 51 passing through an insulating bushing 52. Lead 51 connects to the annulus 48 at one end and to the wire 50 at the terminal point 53. Each of the wires 50 from each tire go to a properly marked signal device 54 carried on the dash of the vehicle. These signaling devices may be lamps properly marked to indicate left front, right front, left rear, etc. Where dual wheels are in use, an additional group of lights may be required, and, furthermore, where the device is applied to vehicles in trains, or to trailer vehicles, additional lamps will be required. For the tires of those vehicles, the signaling device is indicated as being controlled by a manually operated switch 55 connecting one side of the lights to the power source or battery 56, which latter is grounded 57 to the vehicle frame.

For the purpose of transferring the electrical circuit from the spring 45 to the contact 48 appropriate means are arranged for completing this connection when a wheel is replaced, without necessitating the making of any circuit connections by the repair man. In this respect, and with regard to the preferred embodiment of the invention, the connection is made through the centering pin lug 58 which cooperates with the other pin-like elements 13 to secure the wheel and the hub in fixed relationship, the centering pin 58 operating to position the wheel circumferentially relative to the hub. This is more or less standard equipment with all modern vehicles. The pin can be bored out, or a standard pin can be replaced by a pin suitable for use in connection with the present invention. In this regard, having reference more particularly to Figure 4, the pin 58 is bored at 59 and holds the shoulders 60 of the annular insulators 61. These insulators support the brush holder 62 and its stem 63 in spaced relation with respect to the pin itself and the lock nut 64 firmly connects the parts together. The outer end 65 of the stem acts as one contact upon which the spring contact 45 rests. The opposite end of the brush holder has an enlarged cylindrical shell 62 arranged to receive the spring 66 and brush 67. The spring urges the brush against the contact 48 and completes the circuit through the parts giving a continuously sliding contact. It will be readily observed that upon removing the fastening stud 13, the wheel can be demounted from the hub and the removal of the wheel breaks the circuit to the contact 45—65. When the spare wheel is placed upon the hub and the studs 13 tightened up, the circuit is immediately restored by the contacts 45—65.

Although a preferred embodiment of this invention is illustrated and described, variations within the true spirit and scope of the same are to be determined by the appended claims.

What we claim is:

1. In a current conducting assemblage for motor vehicle wheels, wherein a wheel is demountably supported upon an axle hub, a hollow centering pin carried by said hub, a conducting ring insulatably supported upon the vehicle axle, a spring contact insulatably mounted in said centering pin and arranged to engage said conducting ring, a pressure actuated switch mounted on said wheel in cooperative relation with respect to the tire inner tube, and a spring contact carried by said wheel and electrically connected to said pressure switch and arranged to engage the contact in said centering pin, whereby demounting the wheel from the hub interrupts the circuit independently of the wheel mounting means.

2. In a current conducting assemblage for motor vehicles in which a wheel is demountable from an axle supported hub, a hollow centering pin carried by said hub, a conducting ring fixed with respect to the vehicle axle, a spring contact insulatably carried by said pin and arranged for sliding contact with the conducting ring, a pressure actuated switch carried by the wheel rim, a spring contact carried by the wheel, electrically connected to said pressure switch and arranged to engage said centering pin, whereby the demounting of said wheel from said hub interrupts the circuit.

3. In a signalling system for automatically indicating the loss of air pressure within the pneumatic tires of a vehicle, supported on demountable wheels of the bolted-on type, including a hub flange for mounting said wheel, the combination with the wheel rim and the tire inner tube supported thereon of a current controlling switch secured in an opening in the wheel rim and including relatively movable contacts within said switch and operated by the loss of pneumatic pressure in the inner tube, means tending to bias said contacts into circuit closing position, a centering pin carried by said hub flange and arranged for aligning the bolting-on flange of the wheel, a yieldable contact carried by said wheel and electrically connected to said switch, a conducting ring fixed with respect to said flange, and fixed and relatively movable contacts electrically inter-connected and insulatably supported by said pin, arranged to engage said wheel contact and said ring respectively, whereby to complete the circuit of the signalling system.

4. An electric switch actuated responsive to pressure variations of vehicle tires of the pneumatic type, comprising a tire rim providing an electric ground, a housing of conductor material attached to and electrically connected with the rim, a push button of dielectric material movable in the housing and projecting out of the housing through the rim in contact with the tire, a closure element of dielectric material for the housing to confine the push button therein, a terminal member extending through the closure element from outside to inside the housing, a pressure spring balanced against and opposing the pressure of the tire and acting between the push button and the closure element in contact with the terminal, spring seats in the push button and the closure element to hold the spring in position out of contact with the housing, a contact element extending from the push button spring seat in contact with the spring through the push button material to a point exposed to contact the housing when the spring expands and out of contact with the housing when the push button compresses the spring.

5. An electric switch actuated responsive to pressure variations of vehicle tires of the pneumatic type, comprising a tire rim providing an electric ground, a housing of conductor material attached to and electrically connected with the rim, a push button of dielectric material movable in the housing and projecting out of the housing through the rim in contact with the tire, a closure element of dielectric material for the housing to confine the push button therein, a terminal member extending through the closure element from outside to inside the housing, a pressure spring balanced against and opposing the pressure of the tire and acting between the push button and the closure element in contact with the terminal, spring seats in the push button and the closure element to hold the spring in position out of contact with the housing, a contact element extending from the push button spring seat in contact with the spring through the push button material to a point exposed to contact the housing when the spring expands and out of contact with the housing when the push button compresses the spring, means to change the position of the closure element seat in the housing to adjust the pressure action of the spring.

6. An electrical conductor mounting comprising, an axle, a hub rotatable on the axle, a rotary element, means to detachably secure the rotary element to the hub, a centering pin to locate the rotary element on the hub in predetermined position concentrically and circumferentially relative thereto, a longitudinal passage extending from end to end through the centering pin, an electrical conductor element extending through the passage, dielectric material insulating the conductor element from the centering pin.

7. An electrical conductor mounting for vehicles equipped with pneumatic tires comprising, an axle, an electrical conductor ring presenting a raceway concentric with the axle, a brush positioned in engagement with the raceway of the conductor ring, a hub rotatably mounted on the axle, a wheel, means to detachably secure the wheel to the hub, a centering pin to locate the rotary element on the hub in predetermined position concentrically and circumferentially relative thereto, a longitudinal passage extending from end to end through the centering pin, a conductor electrically connected at one end to the brush and conductor ring and extending therefrom through the length of the passage, an insulator between the conductor and the centering pin, a switch on the wheel actuated by abnormal inflation of the pneumatic tire, an instrument on the body of the vehicle, and electrical circuit to operate the instrument responsive to switch actuation comprising a connection between the switch and one terminus of the conductor which extends through the centering pin ring, and a connection between the brush and conductor ring and the instrument.

8. An electrical conductor mounting for vehicles equipped with pneumatic tires comprising, an axle, an electrical conductor ring presenting a raceway concentric with the axle and fixed with reference thereto, a hub rotatably mounted on the axle, a wheel, means to detachably secure the wheel to the hub, a centering pin to locate the rotary element on the hub in predetermined position concentrically and circumferentially relative thereto, a longitudinal passage extending from end to end through one of the centering pins, a conductor extending through the length of the passage, an insulator between the conductor and the pin, a switch on the wheel actuated by abnormal inflation of the pneumatic tire, an instrument on the body of the vehicle, a brush positioned in engagement with the raceway of the conductor ring and connected with one terminus of the conductor through the centering pin, a contact member mounted on the wheel movable into and out of engagement with the terminus of the conductor element opposite the brush, and connections between the switch and the contact member, and between the conductor ring and the instrument, to operate the instrument responsive to switch actuation.

WILLIAM OLIVER BUNDY, Jr.
CHARLES SINCLAIR LEWIS.